(12) United States Patent
Ito (10) Patent No.: US 7,558,355 B2
(45) Date of Patent: Jul. 7, 2009

(54) SYNCWORD DETECTING CIRCUIT AND A BASEBAND SIGNAL RECEIVING CIRCUIT (75) Inventor: Noriyoshi Ito, Chiba (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 732 days.

(21) Appl. No.: 11/011,767

(22) Filed: Dec. 15, 2004

(65) Prior Publication Data

US 2005/0163274 A1    Jul. 28, 2005

(30) Foreign Application Priority Data

Dec. 15, 2003    (JP)    ............... 2003-416916

(51) Int. Cl.
*H04L 7/00*    (2006.01)
(52) U.S. Cl. ...................... 375/365; 375/354; 370/503; 709/248
(58) Field of Classification Search ................ 375/365, 375/354; 370/503; 709/248
See application file for complete search history.

(56) References Cited

U.S. PATENT DOCUMENTS 4,414,676 A * 11/1983 Kraul et al. ................ 375/368

| | | | | |
|---|---|---|---|---|
| 6,587,500 | B1 * | 7/2003 | Persson et al. | 375/142 |
| 6,738,437 | B2 * | 5/2004 | Chi et al. | 375/343 |
| 2003/0076901 | A1 * | 4/2003 | Yuan et al. | 375/319 |
| 2003/0076905 | A1 * | 4/2003 | Schetelig et al. | 375/343 |

FOREIGN PATENT DOCUMENTS

JP    10-313290 A    11/1998

* cited by examiner

*Primary Examiner*—Shuwang Liu
*Assistant Examiner*—Michael R Neff
(74) *Attorney, Agent, or Firm*—Volentine & Whitt, P.L.L.C.

(57) ABSTRACT

A predetermined syncword detecting circuit includes a matched-bit-number comparing circuit, a comparing-result-change detecting circuit, a detected-result storing circuit, a total number detecting circuit, and a syncword detecting circuit. The matched-bit-number comparing circuit acquires and compares a number of bits in a baseband signal that matches bits of the predetermined syncword with a threshold. The comparing-result-change detecting circuit samples the comparison result, and detects changes in the comparison result. The detected-result storing circuit sequentially stores a result of the comparing-result-change detecting circuit. The total-number detecting circuit detects a total number of the result of the matched-bit-number comparing circuit. The result is included in an N cycle period and surpasses the threshold. The syncword detecting circuit detects the predetermined syncword and selects an intermediate phase of the cycles as a detection phase.

16 Claims, 6 Drawing Sheets

SYNCWORD DETECTING CIRCUIT AND A BASEBAND SIGNAL RECEIVING CIRCUIT

BACKGROUND OF THE INVENTION

1. Field of the Invention

The present invention relates to a syncword detecting circuit and a baseband signal receiving circuit. More specifically, the present invention relates to a syncword detecting circuit and a baseband signal receiving circuit that is applicable to, for example, a receiver for a radio signal, which complies with a bluetooth system corresponding to a kind of short distance radio link.

2. Background Information

A conventional bluetooth receiver of a bluetooth system corresponding to a radio link using radio signals lying in a 2.4 GHz radio frequency band has an RFIC (Radio Frequency Integrated Circuit) transceiver for extracting a baseband signal having a 1 MHz symbol transmission rate from the abovementioned 2.4 GHz radio frequency band signals, and a baseband receiving circuit for packet assembly from the extracted baseband signal (digital serial signal).

Transmission of the baseband signal starts with the slot boundary in every 625 .mu.s. A four-symbol (bit)-length preamble signal is first transmitted and then a 64 symbol (bit)-length syncword is subsequently transmitted. Finally, a variable-length payload is transmitted. The baseband receiving circuit of each bluetooth receiver monitors whether each 64 bit-length syncword exists in an input baseband signal. When the syncword addressed to the receiver itself has appeared, a payload thereafter is extracted into the receiving circuit and processed. Therefore, the baseband signal receiving circuit needs to detect a packet having a syncword addressed to the receiving circuit itself. For example, a syncword detector, which is referred to as a sliding correlator, is used when the syncword detector detects a packet which is addressed to the detector itself.

A sliding correlator is a circuit which acquires a correlation between a signal obtained by sampling an input baseband signal by a clock having a frequency (N MHz) equivalent to N times symbol frequency (1 MHz) of the input baseband signal and a 64 bit-length syncword. The sliding correlator stores the input baseband signal in a (63*N+1) bit-length shift-register and determines whether the syncword addressed to the receiver itself is transmitted or not by matching a 64 bit-length signal, which is extracted in every N bits starting with the top of the shift-register to a predetermined 64 bit-length syncword.

This sliding correlator has the advantage of being able to check stably whether the syncword has been detected within one symbol period even if the baseband signal includes noise. For example, a conventional baseband signal receiving circuit finally decides that the syncword is detected when this detected syncword period exceeds a threshold L (where L is greater than 0 and less than or equal to N), which is a continuous cycle number of the sampling frequency.

There is a possibility that a conventional baseband signal receiving circuit is unable to detect the syncword accurately when the syncword is detected intermittently within one symbol period due to a large amount of noise in a baseband signal. For this abovementioned reason, there has been a demand for a baseband signal detecting circuit which is able to regenerate symbols stably and accurately and a word detecting circuit which is able to detect word phases in the baseband signal, under the conditions described. Furthermore, there has been a demand for a syncword detecting circuit and a baseband signal receiving circuit that checks the history of previous N cycles of syncwords for stable syncword detecting and determines whether final syncword detection is successful or not by monitoring whether a detected number of matched bits in the history surpasses a threshold M (where M is greater than 0 and less than or equal to N).

In view of the above, it will be apparent to those skilled in the art from this disclosure that there exists a need for an improved a syncword detecting circuit and a baseband signal receiving circuit. This invention addresses this need in the art as well as other needs, which will become apparent to those skilled in the art from this disclosure.

SUMMARY OF THE INVENTION

It is an object of the present invention to provide a syncword detecting circuit and a baseband signal receiving circuit that accurately detects syncwords even in the presence of a large amount of noise.

To solve the aforementioned problems, a predetermined syncword detecting circuit for detecting syncwords in input baseband signals in accordance with a first preferred embodiment of the present invention includes a matched-bit-number comparing circuit, a comparing-result-change detecting circuit, a detected-result storing circuit, a total number detecting circuit, and a syncword detecting circuit. The matched-bit-number comparing circuit acquires a number of bits in the baseband signal that matches bits of the predetermined syncword. The matched-bit-number comparing circuit compares the number with a first threshold. The comparing-result-change detecting circuit samples the result of the matched-bit-number comparing circuit by a clock having a frequency equivalent to N (where N is an integer greater than or equal to 2) times a symbol transmission rate. The comparing-result-change detecting circuit detects changes in the result of the matched-bit-number comparing circuit. The detected-result storing circuit sequentially stores a result of the comparing-result-change detecting circuit. The total-number detecting circuit detects a total number of the result of the matched-bit-number comparing circuit. Based on the result of the comparing-result-change detecting circuit, which is stored in the detecting-result storing circuit, the result is included in the N cycle period and surpasses the first threshold. The syncword detecting circuit detects the predetermined syncword based on the total-number result of the total-number detecting circuit. Further, the syncword detecting circuit selects an intermediate phase of the cycle, which have come theretofore, as a detection phase.

A baseband signal receiving circuit in accordance with a second preferred embodiment of the present invention includes a sampling circuit and a syncword detecting circuit. The sampling circuit samples the baseband signal at a clock phase which is given from N types of phases in the clock having a frequency equivalent to N (where N is an integer greater than two or equal to 2) times a symbol transmission rate. The syncword detecting circuit detects a syncword included in the baseband signal. Furthermore, the syncword detecting circuit adopts the syncword detecting circuit according to the first embodiment of the present invention, and reflects information of detection phase from the syncword detecting circuit on the clock phase of the sampling circuit.

The present invention provides a baseband signal receiving circuit which is able to restore symbols stably and accurately, or a syncword detecting circuit which is able to detect a word phase in a baseband signals.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. A baseband signal receiving circuit and syncword detecting circuit according to a first preferred embodiment of the present invention is explained as follows with reference to the drawings.

This embodiment describes a syncword detecting circuit and a baseband signal receiving circuit, which checks a history of previous N cycles of syncwords for stable syncword detecting and determines whether final syncword detection is successful or not by monitoring whether a detected number of matched bits in the history surpasses a threshold M (where M is greater than 0 and less than or equal to N).

Figure 1:
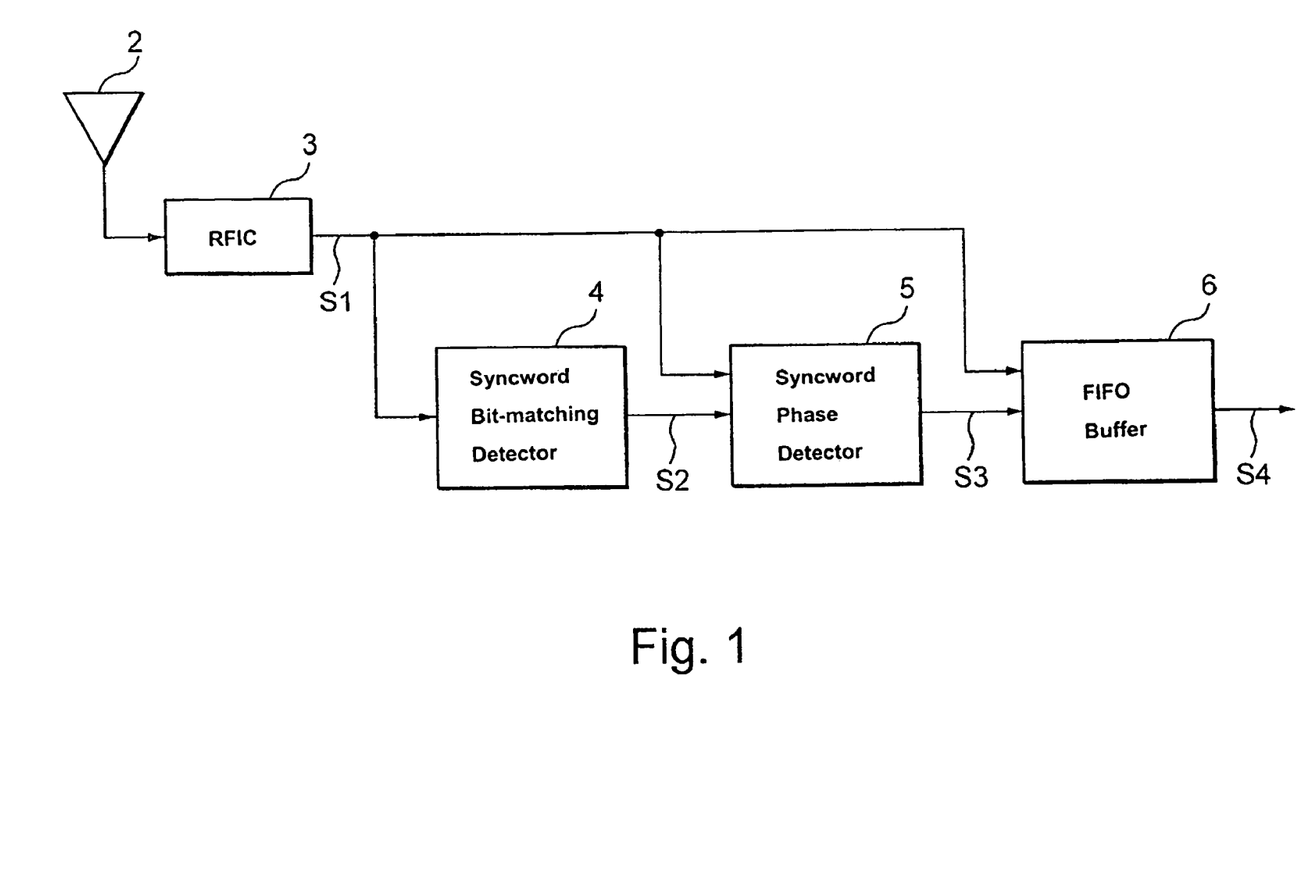
FIG. 1 is a view of block diagram illustrating a basic configuration of a bluetooth receiver in accordance with a preferred embodiment of the present invention.

FIG. 1 is a view of a block diagram that illustrates a basic configuration of a bluetooth receiver according to a first preferred embodiment of the present invention. In FIG. 1, the bluetooth receiver according to this embodiment has a receiving antenna 2, an RFIC transceiver 3 (referred as RFIC in FIG. 1), a syncword bit-matching detector 4, a syncword phase detector 5, and a FIFO buffer 6. The RFIC transceiver 3 extracts a baseband signal S1 having a symbol transmission rate of 1 MHz from a radio signal lying in a 2.4 GHz band captured by the receiving antenna 2. The RFIC transceiver 3 feeds the resultant baseband signal SI into the syncword bit-matching detector 4, the syncword phase detector 5, and the FIFO buffer 6.

The syncword bit-matching detector 4, which is able to be adopted by, for example, a sliding correlator or the like, receives the baseband signal S1 from the RFIC transceiver 3 and samples the input baseband signal S1 by a sampling clock having a frequency (N MHz) equivalent to N (where N is an integer greater than or equal to 2) times a symbol frequency (1 MHz) of the transmission rate of the input baseband signal S1. Further, the syncword bit-matching detector 4 matches the last 64 symbols of the baseband signal S1 and the predetermined 64 bit-length syncword. Then, the syncword bit-matching detector 4 decides whether the matched-bit-number of the predetermined syncword surpasses a threshold L (where 0<L<64 or L=64) or not and outputs a signal cycle syncword detecting signal S2 corresponding to the results thereof.

The syncword phase detector 5 receives the single-cycle syncword-matching signal S2 from the syncword bit-matching detector 4. The syncword phase detector 5 detects a clock phase in an intermediate point within the symbol period, which matches to the predetermined syncword, from N cycles of the phase.

The FIFO buffer 6 receives a syncword phase signal S3 from the syncword phase detector 5 and uses the syncword phase signal S3 as a sampling phase for sampling the baseband signal S1. The FIFO buffer 6 then outputs the payload signal S4, which is the result of the sampling.

The specific configuration and behavior of each of the elements are explained as follows with reference to the drawings.

Figure 2:
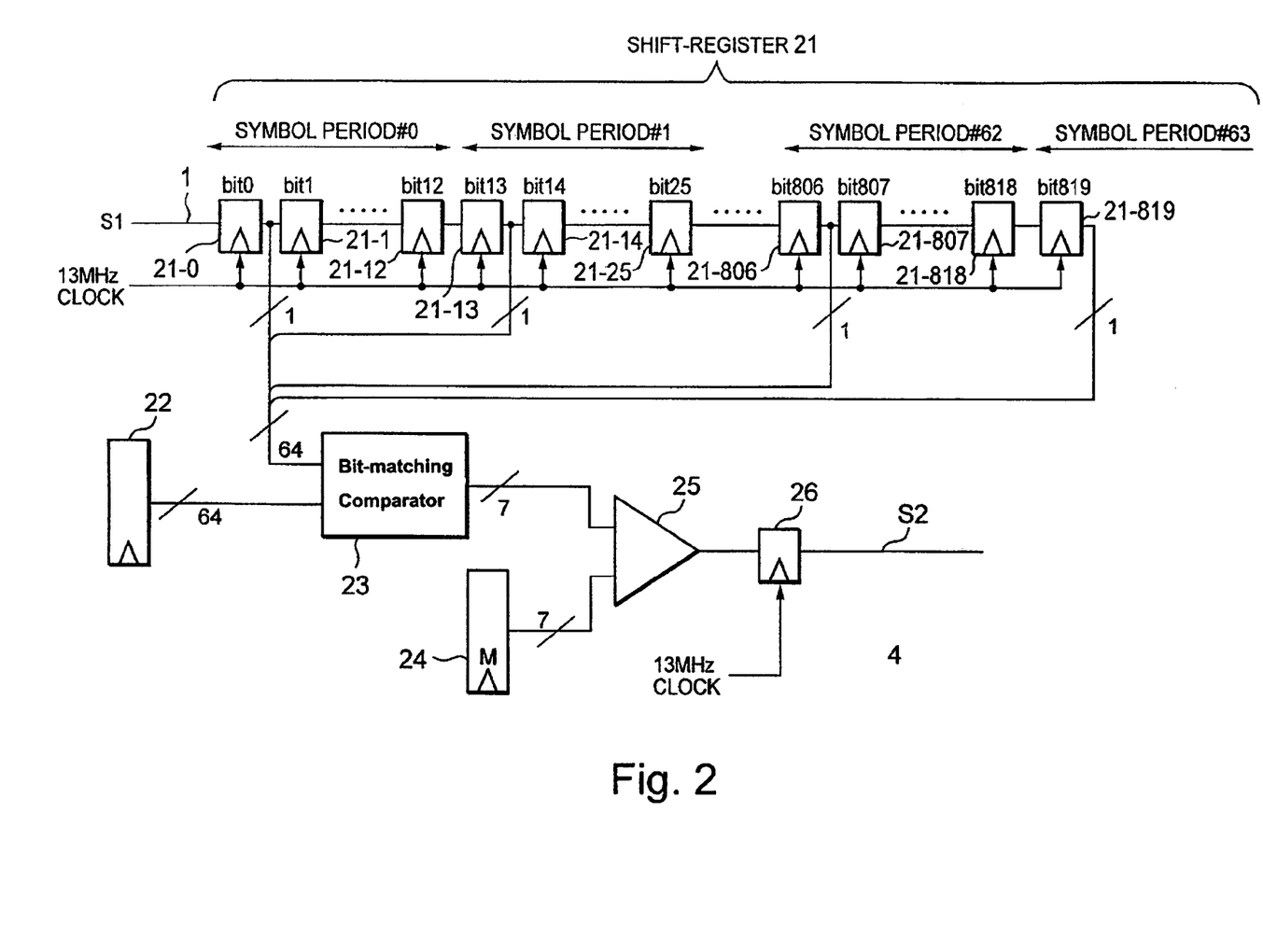
FIG. 2 is a view of a configuration diagram of a syncword bit-matching detector of the bluetooth receiver.

FIG. 2 is a view of a detailed configuration of the syncword bit-matching detector 4. In FIG. 2, the syncword bit-matching detector 4 has an 820-bit shift-register 21, a syncword register 22, a bit-matching comparator 23, a threshold register 24, a magnitude comparator 25, and a shift register 26.

Referring now to FIGS. 1 and 2, the input baseband signal S1 from the RFIC transceiver 3 is sampled by a clock having a frequency equivalent to N times the symbol transmission rate of the baseband signal S1. Further, the predetermined syncword is detected in the baseband signal S1 at every sampling phase from 0 to N−1. Usually, 13 or 12 is selected as the sampling frequency. In this embodiment of the present invention, the 13-selected case is explained, as follows.

A signal, which is obtained by sampling the baseband having a 1 MHz symbol transmission rate by a 13 MHz clock, is stored in the shift-register 21. The shift-register 21 has 820-bit elements, and each register element from No. 21-0 to No. 21-819 is formed to input the 13 MHz clock for the shifting. The shift-register 21 needs to have 819 (=64*13) elements for the 63 bits of the syncword not counting the last bit of the 64 bits of the syncword. Since the 63 bits are set and shifted by the 13 MHz clock and the shift-register 21 needs only one element for the last bit for only one shifting by the 13 MHz clock to enable syncword detecting, the register 21, therefore, has 820 (=63*13+1) elements in this embodiment of the present invention. Further, the 13 MHz clock thereof has a frequency equivalent to 13 times the symbol transmission rate. Therefore, the input content of the baseband signal S1 is inputted to the first element 21-0 in the shift-register 21 and the content of the first element 21-0 is inputted to the register element 21-1, and then is shifted to the following register element 21-1, 21-2, 21-3, . . . , 21-818, 21-819, sequentially. The shift register 21 has 64 taps. The first tap is located in the place where the output of the register element 21-0 is extracted and the following taps are located in the place where register elements 21-13, 21-26, . . . , 21-806, and 21-819 are located. In other words, every 13 elements from the first register element are respectively extracted. Then, when an ideal baseband signal S1 is inputted into the shift-register 21, the register element No.21-0, 21-13, . . . , No.21-806, and No.21-819 respectively store contemporary values of the baseband signal S1 in the different symbol periods. Each output from the taps of the register 21 corresponds to the value in the different symbol periods. Outputs from these taps are given to the bit-matching comparator 23 as parallel bits, while the predetermined 64 bit syncword, which is stored in the syncword registers 22, is fed to the bit-matching comparator 23.

In the bit-matching comparator 23, each bit of 64 bit output data from the taps thereof is checked separately and respectively to determine whether it has the same logical values of each bit of the predetermined 64 bit syncword at the corresponding bit position. Furthermore, the number of the bit, which has a logical value matching the corresponding syncword bit, is given to the magnitude comparator 25. In other words, the bit-matching comparator 23 outputs a matched-bit number after counting how many bits of the 64 bit output from the taps thereof have the same logical value as the corresponding syncword bit. Then, the matched bit-number from the bit-matching comparator 23 has 7 bit length data for 7 bit indication, because the matched bit-number ranges from the minimum value 0 to the maximum value 64, where the minimum value 0 is given when no bit matches the corresponding bit of the predetermined syncword. Further, the maximum value 64 is given when each bit matches to the corresponding bit of the predetermined syncword.

The magnitude comparator 25 is given the predetermined matched-bit number threshold M (0<M<64, or M=64) stored in the threshold register 24 to determine successful detection of the syncword. In the magnitude comparator 25, the matched-bit number is compared with the matched-bit number threshold M from the threshold register 24, and a positive single-cycle syncword-matching signal S2 is outputted when the matched-bit number surpasses the threshold M. For example, when the matched-bit number surpasses the matched-bit number threshold M, the single-cycle syncword-matching signal S2 is set to '1'. In the other case when the bit-matched number does not surpass the matched-bit number threshold M, the single-cycle syncword-matching signal is set to '0'. The matched-bit number threshold usually ranges from 50 to 60, for example, depending on the receiving radio signal conditions.

The shift register 26 is formed to input the 13 MHz clock and to output the output received from the magnitude comparator 25 as the single-cycle syncword S2 having 13 clock cycles.

Next, the configuration and behavior of the syncword phase detector 5, which detects the syncword phase signal S3, based on the single-cycle syncword matching signal S2 from the syncword bit-matching detector 4, is explained in detail as follows.

Here, in a conventional syncword detecting process, the syncword is recognized for detection when the single-cycle syncword matching signal S2 is positive for more than the predetermined cycle period (for example, a 3 to 4 cycle period) within a one symbol period (13 clock cycles) to eliminate an influence from noise or a frequency drift which is included in the input baseband signal S1. In other words, in the conventional syncword detecting process, when the sampling-clock-cycle period counted during the matched-bit number surpasses the matched-bit number threshold M, the intermediate point of the period is determined as a syncword phase. However, when the baseband signal is influenced by a large amount of noise, the continuity of the positive single-cycle syncword matching signal S2 is lost and the sampling-clock-cycle period-length is shortened. Thus, it might be impossible for a conventional detecting method to detect correctly a syncword phase correctly or to detect successfully syncword bit-matching. In contrast, this embodiment of the present invention is able to cope with problems like those described above and correctly detect syncword phases and detect successfully syncword bit-matching. The syncword detector 5 of the present invention, which detects the syncword accurately, is explained hereafter.

Figure 3:
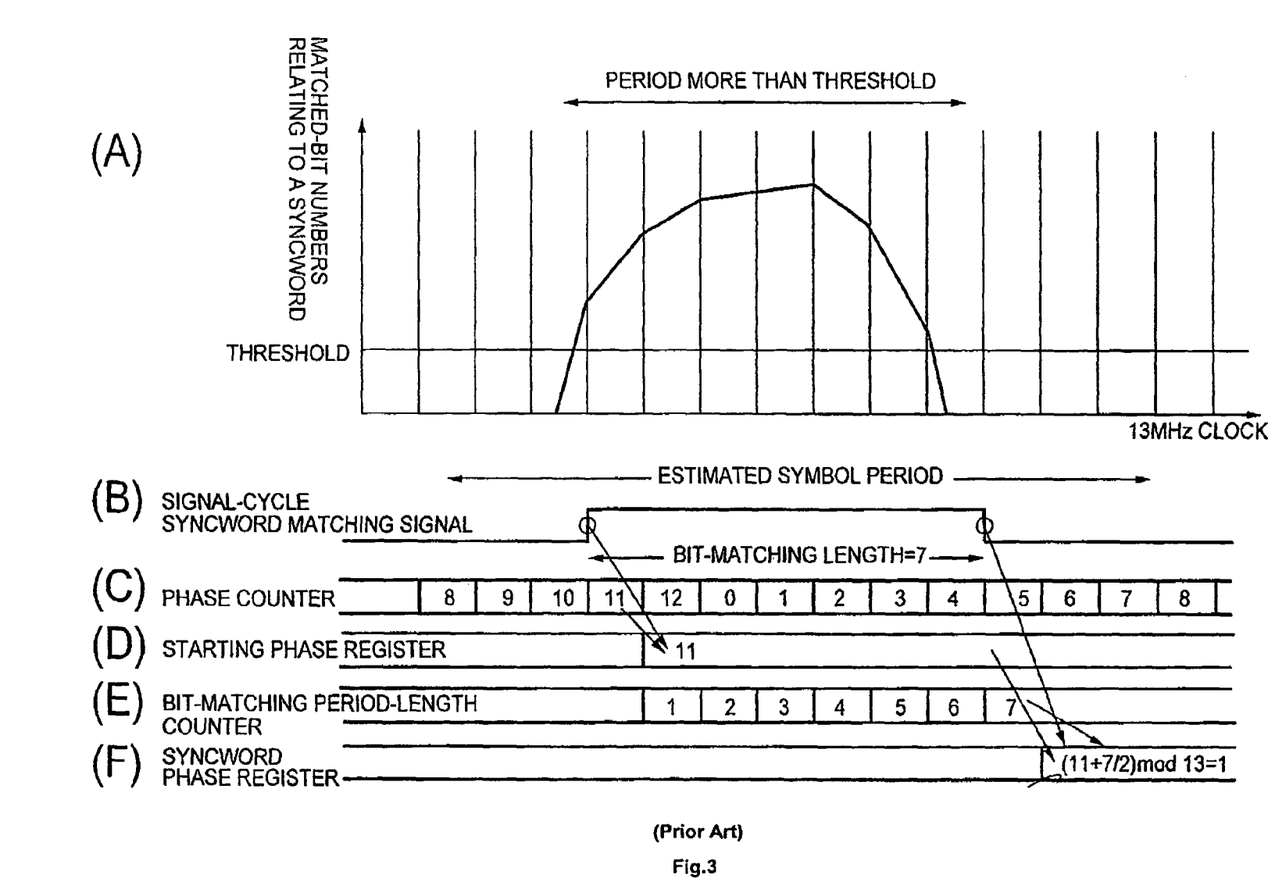
FIG. 3 is a view of a first explanatory diagram illustrating the timing of detecting a syncword in a conventional syncword detector.
Figure 4:
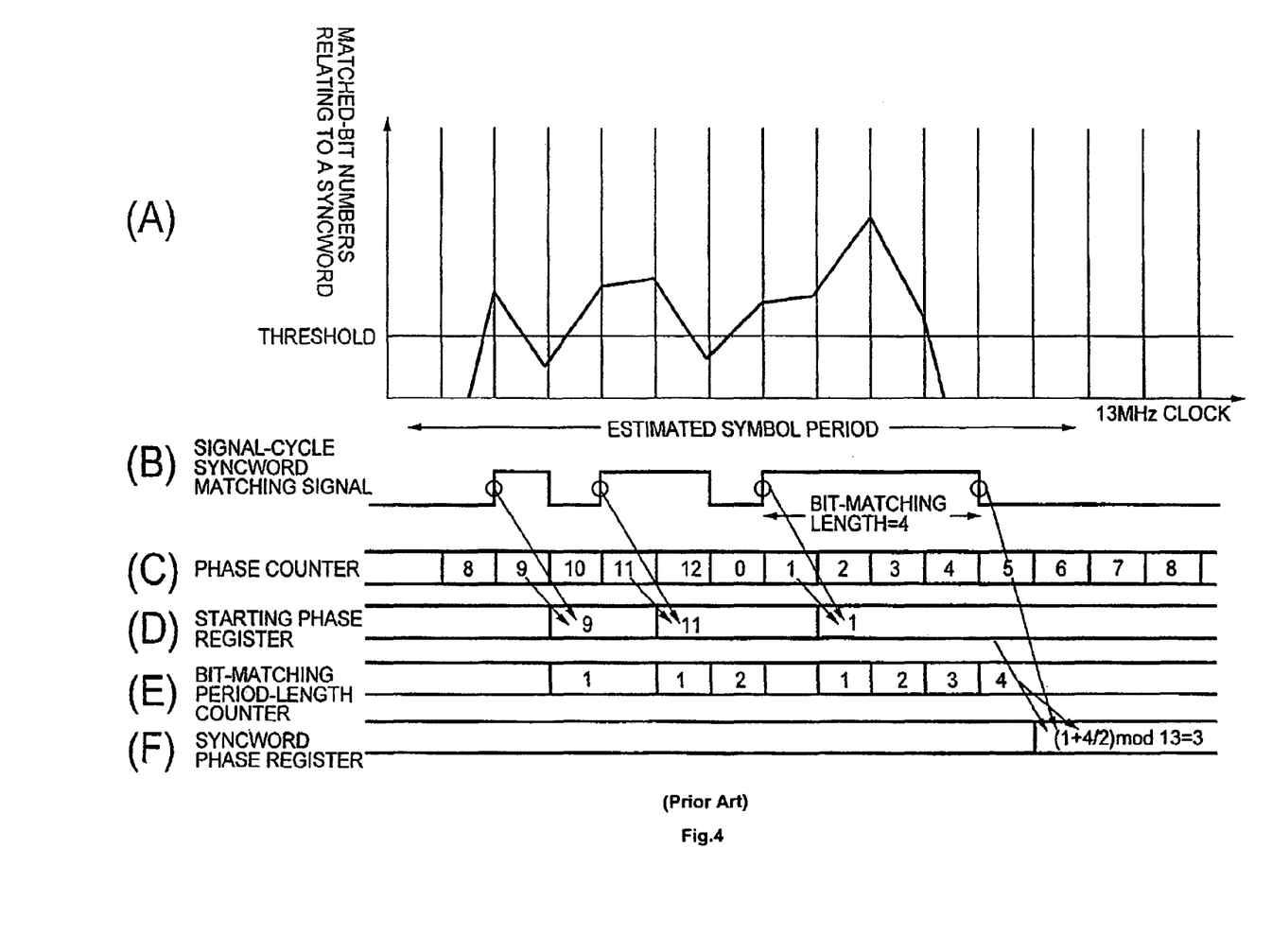
FIG. 4 is a view of a second explanatory diagram illustrating the timing of detecting a syncword in a conventional syncword detector.

To explain conveniently, a situation in which the syncword phase is detected correctly and a situation in which the syncword phase cannot be detected or the syncword bit-matching cannot be detected due to a large amount of noise by a conventional syncword phase detecting method are described in that order with reference to FIGS. 3 and 4. Thereafter, the configuration and behavior of the syncword phase detector 5, based on this embodiment of the present invention are described. FIG. 3 illustrates the operational timing for a case in which the syncword phase is detected correctly using a conventional syncword phase detecting method. FIG. 4 illustrates the operational timing for a case in which the baseband signal cannot be detected correctly due to a large amount of noise.

Line (A) of FIG. 3 shows a change in matched-bit numbers relating to a predetermined syncword, with a horizontal axis representing time (sampling clock cycles) and a vertical axis representing the number of bits matched to the predetermined syncword. Line (B) of FIG. 3 shows a single-cycle syncword matching signal S2.

To summarize the description of the configuration of the conventional syncword phase detector, the conventional syncword phase detector has at least a phase counter, a starting phase register, a bit-matching period counter, and syncword phase register. As shown in line (B) of FIG. 3, when the single-cycle syncword matching signal is changed to be positive (where positive means '1' in the case of FIG. 3), a counting value of the phase counter is loaded into the starting phase register as shown in line (B) of FIG. 3. Here, the phase counter counts up its cyclic counting value from zero to twelve every time the 13 MHz clock enters a unit of time. The counting value indicates the type of sampling clock phase at that instance as shown in line (C) of FIG. 3. At the same time, the bit-matching period-length counter starts to increment its counting value and continues to count until the single-cycle syncword matching signal S2 becomes not positive (i.e., to be '0' in FIG. 3). The number of the cycle indicating the syncword bit-matching period-length is counted herewith as shown in line (E) of FIG. 3. Further, the phase counter determines whether the counting value of the bit-matching period-length counter surpasses the predetermined threshold L (0<L<M, or L=M), or not. When the counting value thereof is more than the threshold L, the intermediate point of bit-matching period is outputted as a syncword phase of the baseband signal S1 (refer to line (F) of FIG. 3).

This syncword phase is information relating to the position showing which sampling clock phase indicates or corresponds to the syncword bit-matching number maximum and can range from '0' to '12'. For example, the syncword phase is determined by the formula as follows, $$[(\text{the register value of the starting phase register}) + (\text{the bit-matching length})/2] \bmod 13.$$

The mod '13' in the above formula is for sorting 13 (13 types of) phases using '0' to '12' which gives surplus by dividing [(the register value of the starting phase register)+ (the bit-matching length)/2] by 13. Therefore, the calculated syncword phase by the above formula shows the information of the position showing which sampling clock phase indicates or corresponds to the syncword bit-matching number maximum and can range from '0' to '12'.

For example, in the case shown in FIG. 3, the starting phase register has a value of eleven and the syncword bit-matching length has the value of seven. Thus, the syncword is calculated by (11+7/2) mod 13 and equals one. Though the calculation result by the above formula is approximately 1.1, the syncword phase is determined to be 1, because the syncword phase cannot have decimal values.

As mentioned in the above, in the case of FIG. 3, the syncword phase is given '1' by that formula. The baseband signal is then sampled at the following FIFO buffer every time the sampling-clock-phase counter has the counting value of '1', and the payload signal output 7, which is inputted following the syncword, is obtained.

Hereafter, referring to FIG. 4, the explanation follows about a case in which the syncword phase or the syncword bit-matching is unable to be detected correctly because the baseband signal is influenced by a large amount of noise.

The explanation hereafter relates to a case according to the aforementioned conventional detecting method. The lines (A) to (B) in FIG. 4 in the explanation correspond to lines (A) to (B) in FIG. 3, respectively.

When the baseband signal is influenced by strong noise, the number of bits matched to the syncword can rise and fall around the boundary of threshold M, as line (A) of FIG. 4 shows.

In this case, as line (B) of FIG. 4 shows, the syncword bit-matching period-length corresponding to the single-cycle syncword bit-matching signal S2 becomes discontinuous and the bit-matching period-length which is counted by the bit-matching period-length counter might be shortened. In other cases, the bit-matching period-length might not surpass the threshold L ($0<L<N$ or $L=N$).

For example, in FIG. 4, the maximum bit-matching length is 4. If the threshold L were set to '4', the circuit determines that syncword bit-matching would not be detected.

Further, in FIG. 4, when the threshold L is set to '3', the circuit judges that the syncword bit-matching is detected, the syncword phase determined as the intermediate point of the bit-matching period might not be necessarily around the intermediate point of the symbol period. As described above, the conventional detecting method of the syncword phase cannot necessarily detect the syncword phase thereof.

Figure 5:
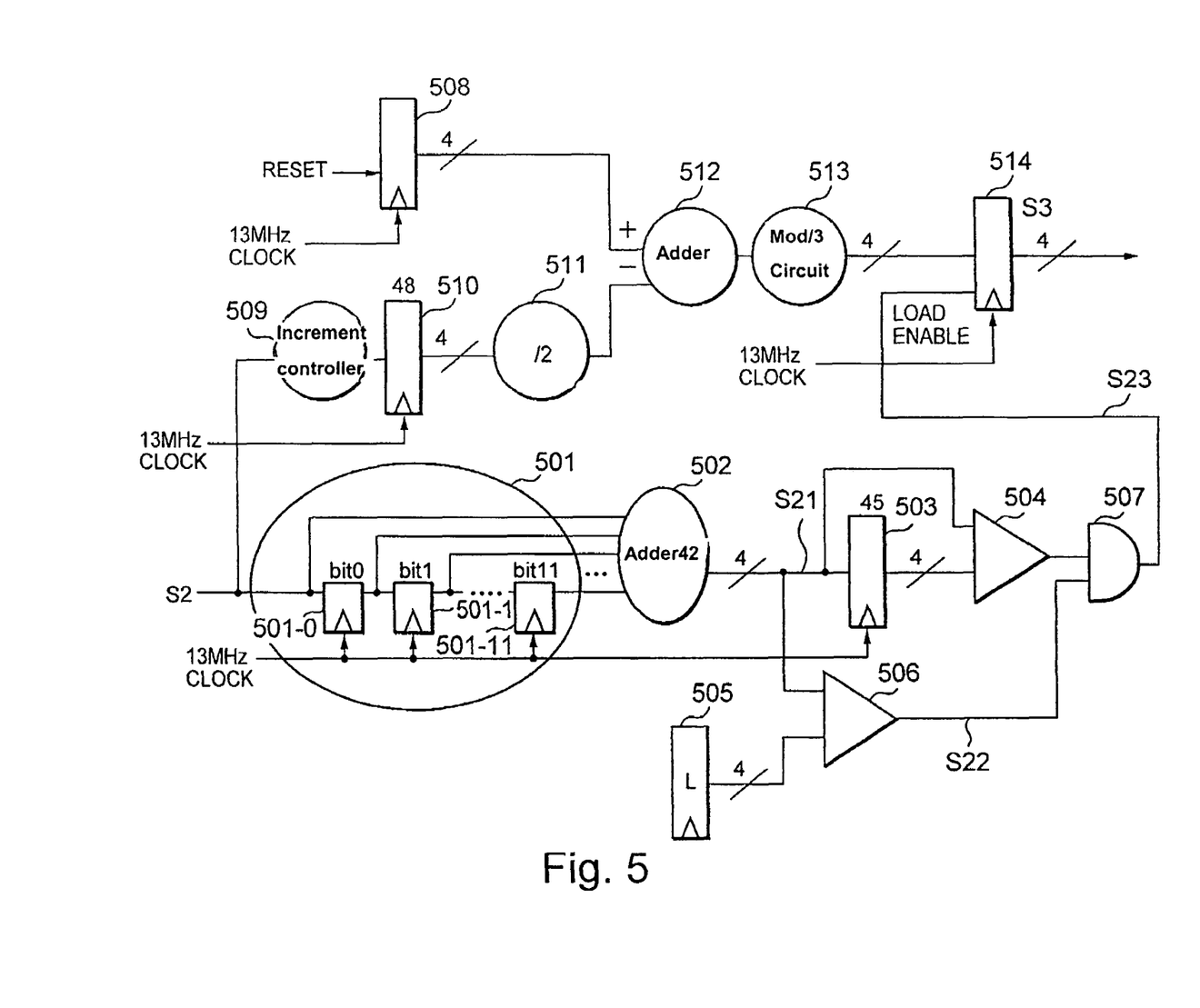
FIG. 5 is a view of a configuration diagram of a syncword phase detector of the bluetooth receiver.
Figure 6:
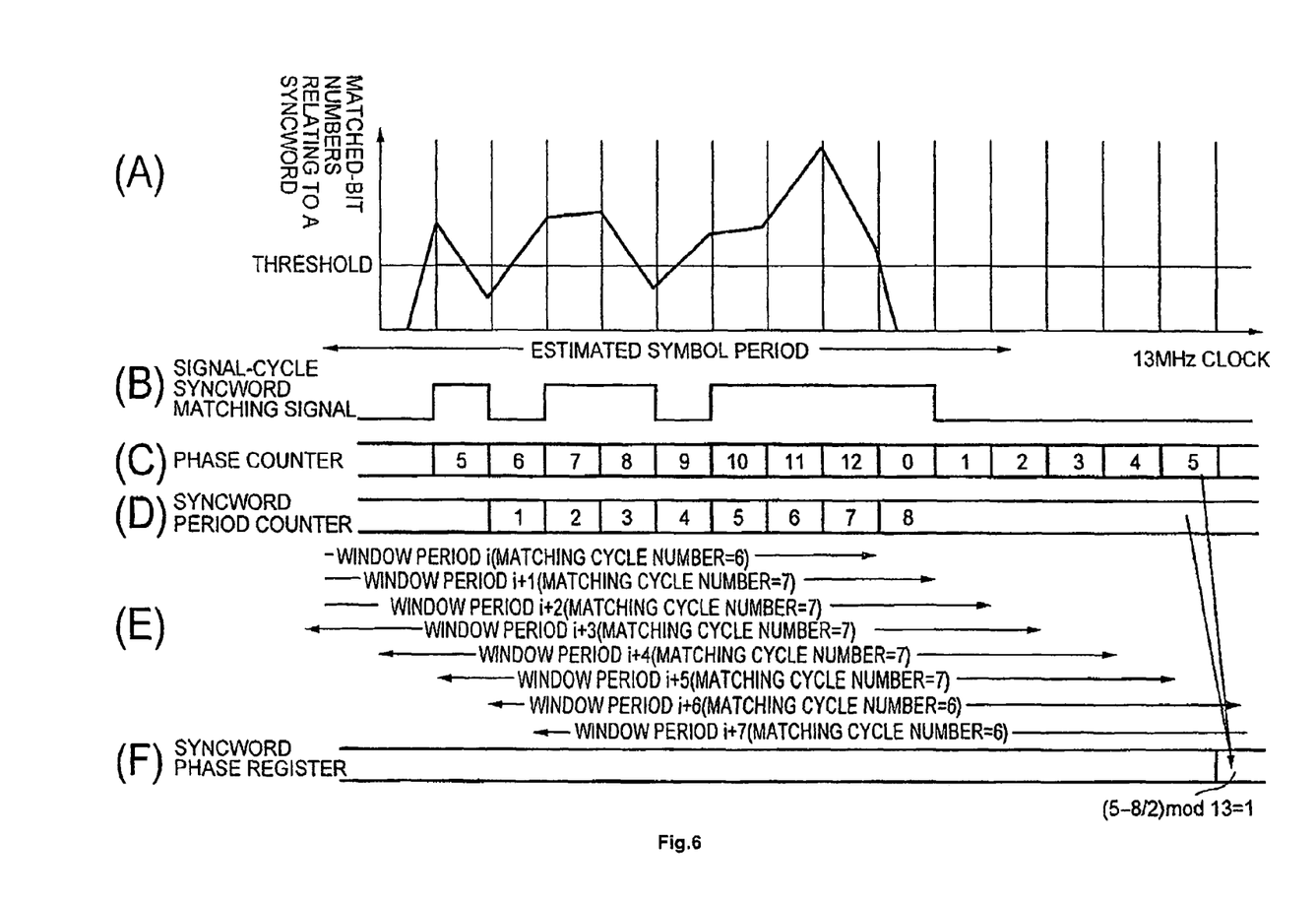
FIG. 6 is a view of an explanatory diagram illustrating the timing of the syncword phase detector.

As shown in FIGS. 5 and 6, the syncword phase detector 5 according to the present invention can cope with the aforementioned case and correctly detect syncword phases. The syncword phase detector 5 stores historical data corresponding to the previous (N−1) bits of the single-cycle syncword-matching signal S2 in a shift-register 501. Further, the syncword phase detector 5 determines the syncword bit-matching by acquiring the phase giving the maximum syncword bit-matching cycle numbers of the past data in the shift-register 501. FIG. 5 illustrates a detailed configuration of the syncword phase detector S according to this embodiment of the present invention.

As FIG. 5 illustrates, the syncword phase detector 5 according to this embodiment of the present invention has the shift-register 501, an adder 502, a register 503, a magnitude comparator 504, a threshold register 505, a magnitude comparator 506, a syncword ending-period detector 507, a phase counter 508, an increment controller 509, a syncword period counter 510, an arithmetic circuit 511, an adder 512, a mod13 circuit 513, and a syncword phase register 514.

The shift-register 501 stores the previous (N−1) cycle single-cycle syncword bit-matching signal S2 from the syncword bit-matching detector 4. In this embodiment of the present invention, since the sampling clock number (N) is 13, the shift-register 501 stores the single-cycle syncword bit-matching signal for the last (13−1=12) bits. Therefore, the shift-register 501 has a 12 bit length, and each element 501-0 to 501-11 thereof is inputted by the 13 MHz clock for shifting.

When the single-cycle syncword bit-matching signal S2 is given to the shift-register 501, the content of the single-cycle syncword bit-matching signal S2 is inputted to the first register-element 501-0 and the content of the first register-element 501-0 is shifted to the following register-element 501-1, and then is sequentially shifted to the following register-element 501-2, 501-3, . . . , 501-11. Thus, the 12 bits of the single-cycle syncword bit-matching signal S2 are stored in the shift-register 501 and are outputted to the adder 502. The content of the single-cycle syncword bit-matching signal S2 is inputted to the adder 502 by the shift-register 501, with the stored history of the last 12 bits of single-cycle syncword bit-matching signal S2.

In the adder 502, the number of the positive single-cycle syncword bit-matching signal S2 is acquired sequentially from the 13 single-cycle syncword bit-matching signals, including the single-cycle syncword bit-matching signal S2 for the past 12 bit symbol data and the present single-cycle syncword bit-matching signal. Namely, in the adder 502, the number of bits matched to the syncword (syncword bit-matching cycle number S21) is acquired from the present single-cycle syncword bit-matching signal and the history of the single-cycle syncword bit-matching signals for the last 12 bits. The syncword bit-matching cycle number S21 (is indicated with 4 bits because of ranging '0' to '12') is inputted to the magnitude comparator 506, the register 503, and the magnitude comparator 504.

Further, the magnitude comparator 506 is given the bit-matching period-length threshold L stored in the threshold register 505. Further, in the magnitude comparator 506, the syncword bit-matching cycle number S21 from the adder 502 is compared with the bit-matching period-length threshold L. When the syncword bit-matching cycle number S21 surpasses L, the positive multi-cycle syncword bit-matching signal S22 is inputted to the syncword ending-period detector 507.

For example, when the syncword bit-matching cycle number S21 surpasses the bit-matching length threshold L, the multi-cycle syncword bit-matching signal S22 is set to '1', and is set to '0' when the syncword bit-matching cycle number S21 does not. The syncword bit-matching cycle number S21 from the adder 502 is sequentially given to the register 503 and the comparator 504. Here, the register 503 is inputted with the 13 MHz clock and the syncword bit-matching cycle number S21 is stored therein by one cycle of the 13 MHz clock. Since the register 503 can store just one cycle of the syncword bit-matching cycle number S21, the ending period of the syncword can be recognized. Furthermore, the syncword bit-matching cycle number S21 for the one cycle is given to the magnitude comparator 504 before being stored in the register 503.

In the magnitude comparator 504, the magnitude of the syncword bit-matching cycle number S21 for the last (one cycle before) is compared with the magnitude of the present syncword bit-matching cycle number. Then, the positive syncword ending-period signal is inputted to the syncword ending-period detector 507 at the moment the present syncword bit-matching cycle number S21 has become less than the last syncword bit-matching cycle number S21. Thus, the end of the syncword can be recognized. For example, at the moment the present syncword bit-matching cycle number S21 has becomes less than the last syncword bit-matching cycle number S21, syncword ending-period signal is set to '1', and is set to '0' in the other case.

As explained above, the multi-cycle syncword bit-matching signal S22 from the magnitude comparator 506 and the syncword ending-period signal from the magnitude comparator 504 are inputted to the syncword ending-period detector 507. When both of the positive multi-cycle syncword bit-matching signal S22 and the positive syncword ending-period signal are given to the syncword ending period detector 507, the circuit determines that the predetermined syncword in the baseband signal S1 is detected and then the positive syncword ending-period detecting signal S23 is given to the syncword phase register 514.

The syncword ending-period detecting signal S23 is used as a trigger signal to determine the syncword phase signal S3. That is, the syncword ending-period detecting signal 23 is inputted to the aforementioned syncword phase register 514 as a trigger signal in order to store the syncword phase S3 therein. While, single-cycle syncword bit-matching signal S2 from the syncword bit-matching detector 4 is given to the increment controller 509, as well.

When the single-cycle syncword bit-matching signal S2 is inputted to the increment controller 509, the increment controller 509 starts to make the syncword period counter 510 increments the counting value thereof. Here, the 13 MHz clock is inputted to the syncword period counter 510 and increments the counting value by the increment controller 509 controls. Then, the syncword period length is counted by the syncword period counter 510.

The syncword period counter 510 initializes its counting value to '1' when the single-cycle syncword bit-matching signal S2 is inputted to the increment controller 509, and continues to increment its counting value by '1' till the syncword ending-period signal becomes positive. The counting value thereof is given to the arithmetic circuit 511. Further, the phase counter 508 increments cyclically from '0' to '12' every time the 13 MHz clock inputs. The counting value by the phase counter 508 is given to the adder 512.

The contents in the phase counter 508 and the syncword period counter 510 are used to determine the syncword phase signal S3 as follows. The arithmetic circuit 511, the adder 512, and the mod 13 circuit 513 are circuits which calculate the syncword phase signal S3. For example, the syncword phase is calculated as follows,

[(the contents of the phase counter−the syncword period counter)/2] mod 13.

In other words, the content of the syncword period counter 510 is inputted to the arithmetic circuit 511 and the counting value is divided by '2' and the dividing result is given to the adder 512.

The adder 512 receives the counting value from the phase counter 508 and the calculating result from the arithmetic circuit 511. The counting value is subtracted by the calculating result from the arithmetic circuit 511 and then the subtracted result is inputted to the mod13 circuit 513. Here, the mod 13 circuit 513 is provided to sort 13 (13 types of) phases using '0' to '12' and to obtain a surplus by dividing [(the register value of the starting phase register)+(the bit-matching length)/2] by 13.

The result of the mod13 circuit 513 is inputted to the syncword phase register 514. The syncword phase register 514 outputs the clock phase as a syncword phase signal S3 for the baseband signal S1 at the instance when the positive syncword ending-period detecting signal S23 is inputted as a trigger signal from the syncword ending-period detector 507.

Next, the timing of detecting the syncword phase signal S3 by the syncword phase detector 5 is described referring to FIG. 6, as follows.

In FIG. 6, line (A) shows changes of the number of bits matched to the predetermined syncword, where the horizontal axis represents time (sampling clock cycles) and the vertical axis represents the number of bits matched to the predetermined syncword. Line (B) of FIG. 6 shows the single-cycle syncword bit-matching signal S2 from the syncword bit-matching detector 4, and line (C) of FIG. 6 shows the counting value which is cyclically incremented by the phase counter 508.

When the single-cycle syncword bit-matching signal S2 given to the syncword detector 5 is inputted to the increment controller 509, the syncword period counter 510 is initialized to '1' by the increment controller 509 and the syncword period counter 510 starts to increment its counting value (refer to line (D) of FIG. 6).

Referring now to FIGS. 5 and 6, in line (E) of FIG. 6, each of the window periods i corresponds to each of 13(N) clock cycle numbers, and the bit-matching cycle-number shows the number of the syncword bit-matching cycle-number S21 (that is, the output from the adder 502). In the syncword ending-period detector 507, the syncword ending-period detecting signal S23 is given to the syncword phase register 514 when the multi-cycle syncword bit-matching signal S22, which becomes positive when the threshold L is surpassed in the magnitude comparator 504, is inputted thereto and the syncword ending-period signal S23, which becomes positive when the syncword bit-matching cycle-number S21 becomes less than the last syncword bit-matching cycle-number S21, is inputted thereto.

As the syncword phase signal S3, the syncword phase register 514 outputs the phase which is calculated by the predetermined formula based on the content of the phase counter 508 and the content of syncword period counter 510 at the instance when the syncword ending-period detecting signal S23 from the syncword ending period detector 507 is given as a trigger signal.

For example, in the case of FIG. 6, the matching cycle number (the syncword bit-matching cycle-number) becomes less than the last matching cycle number at the window period i+6, and then the syncword ending-period detecting signal S23 is outputted from the syncword ending-period detector 507 at that instance. As the syncword phase signal S3 of the baseband signal S1, the syncword phase detecting register 514 outputs the clock phase '1', which is calculated, based on the content '5' of the phase counter 507 and the content '8' of the syncword period counter 510 at the instance when the syncword ending-period detecting signal S23 is inputted thereto.

In the case of FIG. 6, the syncword phase is calculated to be '1' and then the baseband signal S1 is sampled in the following FIFO buffer 6 when the counting value of the sampling clock counter is '1' and the payload signal 7 inputted following the syncword is acquired. Further, the syncword bit-matching detector 4 and the syncword phase detector 5 can be turned off to reduce the power consumption of the circuitry after the detecting of the syncword is completed until the next requirement for detecting of the syncword is done.

As explained before, in this embodiment of the present invention, syncword detection amid a large amount of noise is possible because the syncword detecting phase is set around the sampling phase where the sliding correlation between the input baseband signal and the syncword is maximized. Since the correlation of the previous N−1 bit signals is stored as the history and the syncword phase is detected using the history information, syncword detection among an even greater amount of noise is possible.

Furthermore, since the sampling phase for the following payload thereafter is set to the detected syncword phase, or the sampling phase around the position where the sliding correlation are maximized, an accurate payload sampling is possible.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Though the abovementioned embodiment shows an application for a bluetooth baseband signal receiver, the application of the present invention is not limited to a bluetooth receiver and can be applied to baseband signal receiver, including a baseband signal of serial data. Further, the transmission path is not limited to a radio transmission path. The configuration of the syncword phase detector in the aforementioned embodiment is not only for detecting syncwords, and is applicable to a serial data receiver including a predetermined word not limited to synchronization. The syncword bit-matching detector 4 in the abovementioned embodiment of the present invention can be made of SRAMs to reduce the hardware circuitry or the power consumption.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-416916, filed on Dec. 15, 2003. The entire disclosure of Japanese Patent Application No. 2003-416916 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A syncword detecting circuit for detecting a predetermined syncword in an input baseband signal, comprising:

a matched-bit-number comparing circuit that determines a number of bits in the baseband signal that match bits of a predetermined syncword, and that compares said number with a first threshold;

a comparing-result-change detecting circuit that samples a result of said matched-bit-number comparing circuit by a clock having a frequency equivalent to an integer N greater than or equal to two times a symbol transmission rate of the baseband signal, and that detects a change of said result of said matched-bit-number comparing circuit;

a detected-result storing circuit that stores sequentially a result of said comparing-result-change detecting circuit and to also store historical data of results of said comparing-result-change detecting circuit of previous cycle periods;

a total-number detecting circuit that detects a total number of said results of said matched-bit-number comparing circuit from a present cycle period and the previous cycle periods, said results of said matched-bit-number comparing circuit being included in cycle periods of said clock surpassing said first threshold, based on the results of said comparing-result-change detecting circuit stored in said detected-result storing circuit; and a syncword detecting circuit that detects said predetermined syncword based on a total-number result of said total-number detecting circuit, and that selects an intermediate phase of a cycle period having a maximum number of bits that match as a detection phase.

2. The syncword detecting circuit according to claim 1, where said total-number detecting circuit that provides a present detecting result from said comparing-result-change detecting circuit, and a last detecting result stored in said detected-result storing circuit.

3. The syncword detecting circuit according to claim 2, wherein said predetermined syncword is detected at an instance said total-number result surpasses a second threshold and has become less than a previous cycle period, and said intermediate phase of said cycle period and an intermediate phase of that previous cycle period are detected based on a number of that previous cycle period from when detecting results surpass said first threshold until detecting of said predetermined syncword is completed and a clock phase when said predetermined syncword is detected.

4. The syncword detecting circuit according to claim 3, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit-number in said extracted data that matches the bits in said predetermined syncword, and compares said matched-bit-number with said first threshold.

5. The syncword detecting circuit according to claim 2, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit number in said extracted data that matches the bits in said predetermined syncword, and compares said matched-bit number with said first threshold.

6. The syncword detecting circuit according to claim 1, wherein said predetermined syncword is detected at an instance said total-number result surpasses a second threshold and has become less than a previous cycle period, and said intermediate phase of said cycle period and an intermediate phase of that previous cycle period are detected based on a number of that previous cycle period from when detecting results surpass said first threshold until detecting of said predetermined syncword is completed and a clock phase when said predetermined syncword is detected.

7. The syncword detecting circuit according to claim 6, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit-number in said extracted data that matches the bits in said predetermined syncword, and compares said matched-bit-number with said first threshold.

8. The syncword detecting circuit according to claim 1, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit-number in said extracted data that matches the bits in said predetermined syncword, and compares said matched-bit-number with said first threshold.

9. A baseband signal receiving circuit comprising:

a sampling circuit that samples a baseband signal at a clock phase given from N types of phase in a clock having a frequency equivalent to N times a symbol transmission rate, N being an integer greater than or equal to two; and a syncword detecting circuit that detects a syncword included in said baseband signal, said syncword detecting circuit including a matched-bit-number comparing circuit that determines a number of bits in the baseband signal that match bits of a predetermined syncword, and that compares said number with a first threshold, a comparing-result-change detecting circuit that samples a result of said matched-bit-number comparing circuit by a clock having a frequency equivalent to an integer greater than or equal to two times a symbol transmission rate of the baseband signal, and that detects a change of said result of said matched-bit-number comparing circuit, a detected-result storing circuit that stores sequentially a result of said comparing-result-change detecting circuit, and that also stores historical data of results of said comparing-result-change detecting circuit of previous cycle periods, a total-number detecting circuit that detects a total number of said results of said matched-bit-number comparing circuit from a present cycle period and the previous cycle periods, said results of said matched-bit-number comparing circuit being included in cycle periods of said clock surpassing said first threshold, based on the results of said comparing-result-change detecting circuit stored in said detected-result storing circuit, and a syncword detecting circuit that detects said predetermined syncword based on a total-number result of said total-number detecting circuit, and that selects an intermediate phase of a cycle period having a maximum number of bits that match as a detection phase.

10. The baseband signal receiving circuit according to claim 9, wherein said total-number detecting circuit provides a present detecting result from said comparing-result-change detecting circuit, and a last detecting result stored in said detected-result storing circuit.

11. The baseband signal receiving circuit according to claim 10, wherein said predetermined syncword is detected at an instance said total-number result surpasses a second threshold and has become less than a previous cycle period, and said intermediate phase of said cycle period and an intermediate phase of that previous cycle period are detected based on a number of that previous cycle period from when detecting results surpass said first threshold until detecting of said predetermined syncword is completed and a clock phase when said predetermined syncword is detected.

12. The baseband signal receiving circuit according to claim 11, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit-number in said extracted data that matches the bits in said predetermined syncword, and compares said matched-bit-number with said first threshold.

13. The baseband signal receiving circuit according to claim 10, wherein said matched-bit-number comparing circuit includes, a high-speed-sampling data storing unit that sequentially stores data sampled by said clock, a data extracting unit that extracts data stored in said high-speed-sampling data storing unit by a number equal to a number of bits of said predetermined syncword with said extracted data having a time difference corresponding to N cycles of said clock to each other, and a matched-bit number comparing unit that acquires a matched-bit-number in said extracted data that matches the bits in said predetermined syncword, and compares said matched-bit-number with said first threshold.

14. The baseband signal receiving circuit according to claim 9, wherein said predetermined syncword is detected at an instance said total-number result surpasses a second threshold and has become less than a previous cycle period, and said intermediate phase of said cycle period and an intermediate phase of that previous cycle period are detected based on a number of that previous cycle period from when detecting results surpass said first threshold until detecting of said predetermined syncword is completed and a clock phase when said predetermined syncword is detected.

15. The baseband signal receiving circuit according to claim 14, wherein said matched-bit-number comparing circuit includes,
- a high-speed-sampling data storing unit that sequentially stores data sampled by said clock,
- a data extracting unit that extracts data stored in said high-speed-sampling data storing unit by a number equal to a number of bits of said predetermined syncword with said extracted data having a time difference corresponding to N cycles of said clock to each other, and
- a matched-bit number comparing unit that acquires a matched-bit-number in said extracted data that matches the bits in said predetermined syncword, and compares said matched-bit-number with said first threshold.

16. The baseband signal receiving circuit according to claim 9, wherein said matched-bit-number comparing circuit includes,
- a high-speed-sampling data storing unit that sequentially stores data sampled by said clock,
- a data extracting unit that extracts data stored in said high-speed-sampling data storing unit by a number equal to a number of bits of said predetermined syncword with said extracted data having a time difference corresponding to N cycles of said clock to each other, and
- a matched-bit number comparing unit that acquires a matched-bit-number in said extracted data that matches the bits in said predetermined syncword, and compares said matched-bit-number with said first threshold.

* * * * *